(12) United States Patent
Archambault

(10) Patent No.: US 6,567,196 B1
(45) Date of Patent: May 20, 2003

(54) DENSE WDM OPTICAL MULTIPLEXER AND DEMULTIPLEXER

(75) Inventor: Jean-Luc Archambault, Severna Park, MD (US)

(73) Assignee: Ciena Corporation, Linthicum, MD (US)

(*) Notice: Subject to any disclaimer, the term of this patent is extended or adjusted under 35 U.S.C. 154(b) by 0 days.

(21) Appl. No.: 09/274,063

(22) Filed: Mar. 22, 1999

(51) Int. Cl.⁷ .............................................. H04J 14/02
(52) U.S. Cl. ................. 359/124; 359/127; 359/130; 359/133; 359/161
(58) Field of Search ............................. 359/124, 127, 359/161, 130, 154, 133, 173, 174, 176, 177, 179, 341, 337; 385/24, 16, 140, 17, 37

(56) References Cited

U.S. PATENT DOCUMENTS

| | | | | |
|---|---|---|---|---|
| 5,546,210 A | * | 8/1996 | Chraplyvy et al. | 359/124 |
| 5,588,087 A | * | 12/1996 | Emmons et al. | 385/140 |
| 5,748,350 A | * | 5/1998 | Pan et al. | 359/130 |
| 5,841,557 A | * | 11/1998 | Otsuka et al. | 359/122 |
| 5,912,750 A | * | 6/1999 | Takeda et al. | 359/124 |
| 6,057,959 A | * | 5/2000 | Taylor et al. | 359/341 |
| 6,091,538 A | * | 7/2000 | Takeda et al. | 359/341 |
| 6,256,431 B1 | * | 7/2001 | Mesh | 385/24 |
| 6,263,126 B1 | * | 7/2001 | Cao | 385/24 |
| 6,271,948 B1 | * | 8/2001 | Toyohara | 359/127 |
| 6,281,997 B1 | * | 8/2001 | Alexander et al. | 359/130 |
| 6,297,895 B1 | * | 10/2001 | Okuno | 359/124 |

FOREIGN PATENT DOCUMENTS

| | | |
|---|---|---|
| JP | 62280307 | 7/1987 |
| JP | 07030520 | 1/1995 |
| WO | 9913607 | 3/1999 |

* cited by examiner

Primary Examiner—Leslie Pascal
Assistant Examiner—Hanh Phan
(74) Attorney, Agent, or Firm—David L. Soltz

(57) ABSTRACT

In accordance with the present invention, optical channels to be demultiplexed are supplied to first and second optical fibers via an optical splitter. Low loss interference filters, for example, coupled to the first and second optical fibers, select respective groups of channels. Each group of channels is next demultiplexed with sub-demultiplexers into individual channels, each of which is then sensed with a corresponding photodetector. Although the optical splitter introduces an optical power loss at the input to the demultiplexer, the interference filters and sub-demultiplexers create little additional loss. As a result, the total power loss associated with the present invention is significantly less than that obtained with a conventional n channel demultiplexer based on a 1×n splitter. Accordingly, large numbers of channels, e.g., in excess of forty can be readily demultiplexed and detected. Optical multiplexers are further disclosed for supplying relatively large number of channels to a single optical fiber.

18 Claims, 17 Drawing Sheets

DENSE WDM OPTICAL MULTIPLEXER AND DEMULTIPLEXER

FIELD OF THE INVENTION

The present invention is directed to an optical demultiplexer for demultiplexing optical signals in a dense wavelength division multiplexed system.

Optical communication systems are a substantial and fast growing constituent of communication networks. The expression "optical communication system," as used herein, relates to any system which uses optical signals to convey information across an optical waveguiding medium, for example, an optical fiber. Such optical systems include but are not limited to telecommunication systems, cable television systems, and local area networks (LANs). Currently, the many optical communication systems are configured to carry an optical channel of a single wavelength over one or more optical waveguides. To convey information from plural sources, time-division multiplexing is frequently employed (TDM). In time-division multiplexing, a particular time slot is assigned to each signal source, the complete signal being constructed from the portions of the signals collected from each time slot. While this is a useful technique for carrying plural information sources on a single channel, TDM capacity is limited by fiber dispersion and the need to generate high peak power pulses.

While the need for communication services increases, the current capacity of existing waveguiding media is limited. Although capacity may be expanded e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. WDM systems typically include a plurality of transmitters, each respectively transmitting signals on a designated one of a plurality of channels or wavelengths. The channels are combined by a multiplexer at one end terminal and transmitted on a single fiber to a demultiplexer at another end terminal where they are separated and supplied to respective receivers.

Recently, dense WDM (DWDM) systems transmitting 8 channels on a single fiber have been proposed. These systems can include a demultiplexer having a 1×8 optical splitter, which receives the 8 channels on an input fiber, and outputs the channels on each of 8 outputs. The power level on each of the outputs, however, is approximately ⅛ the input power level. Optical components are respectively coupled to the outputs of the 1×8 splitter for outputting a corresponding one of the 8 channels, which introduce additional loss.

Although 8 channel WDM systems provide improved capacity, the need for additional capacity has increased with growing internet traffic and demand for multimedia services. Thus, DWDM systems having higher channel counts are currently being developed. In high channel count systems, however, it is difficult to multiplex and demultiplex a large number of optical channels. For example, in a 40 channel DWDM system, a 1×40 splitter would be inadequate to demultiplex each of the channels because the power level at each output of such a splitter would be insufficient to maintain an adequate signal to noise ratio. As a result, the transmitted channels cannot be adequately detected. On the other hand, although an optical amplifier could be used to increase the power on the input of the 1×40 splitter, such an amplifier can be difficult to manufacture, and would fail to provide the requisite optical power per channel at higher channel counts. Moreover, if amplifiers were to be provided at each of the outputs of the 1×40 splitter, the cost of the demultiplexer would be excessive.

Thus, there is a need for a multiplexer and demultiplexer suitable for incorporation into a high channel count DWDM system which minimizes power loss and enables adequate detection of the transmitted channels. There is also a need for a scaleable DWDM system, which can readily accommodate additional channels with minimal expense.

SUMMARY OF THE INVENTION

Consistent with the present invention, an optical device is provided comprising an optical splitter having an input and first and second outputs. The input of the optical splitter is coupled to an input optical path, which carries a plurality of optical channels. Each of the optical channels has a respective wavelength. The first output of the optical splitter being coupled to a first output optical path, and the second output being coupled to a second output optical path, with the first and second output optical paths each carrying the plurality of optical channels.

The optical device consistent with the present invention further comprises a first optical filtering element coupled to the first output optical path for selecting a first group of said plurality of optical channels; and a second optical filtering element coupled to the second output optical path for selecting a second group of said plurality of optical channels. A first optical demultiplexer is coupled to the first optical filtering element and includes a plurality of outputs. A corresponding one of the first group of channels appearing on a respective one of the plurality of outputs of said first optical demultiplexer. Further, a second optical demultiplexer is coupled to the second optical filtering element. The second optical demultiplexer comprises a plurality of outputs, a corresponding one of the second group of channels appearing on a respective one of the plurality of outputs of the second optical demultiplexer.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

In accordance with the present invention, optical channels to be demultiplexed are supplied to first and second optical fibers via an optical splitter. Low loss interference filters, for example, coupled to the first and second optical fibers, select respective groups of channels. Each group of channels is next demultiplexed with sub-demultiplexers into individual channels, each of which is then sensed with a corresponding photodetector. Although the optical splitter introduces an optical power loss at the input to the demultiplexer, the interference filters and sub-demultiplexers create little additional loss. As a result, the total power loss associated with the present invention is significantly less than that obtained with a conventional n channel demultiplexer based on a 1×n splitter. Accordingly, large numbers of channels, e.g., in excess of forty can be readily demultiplexed and detected.

Figure 1:
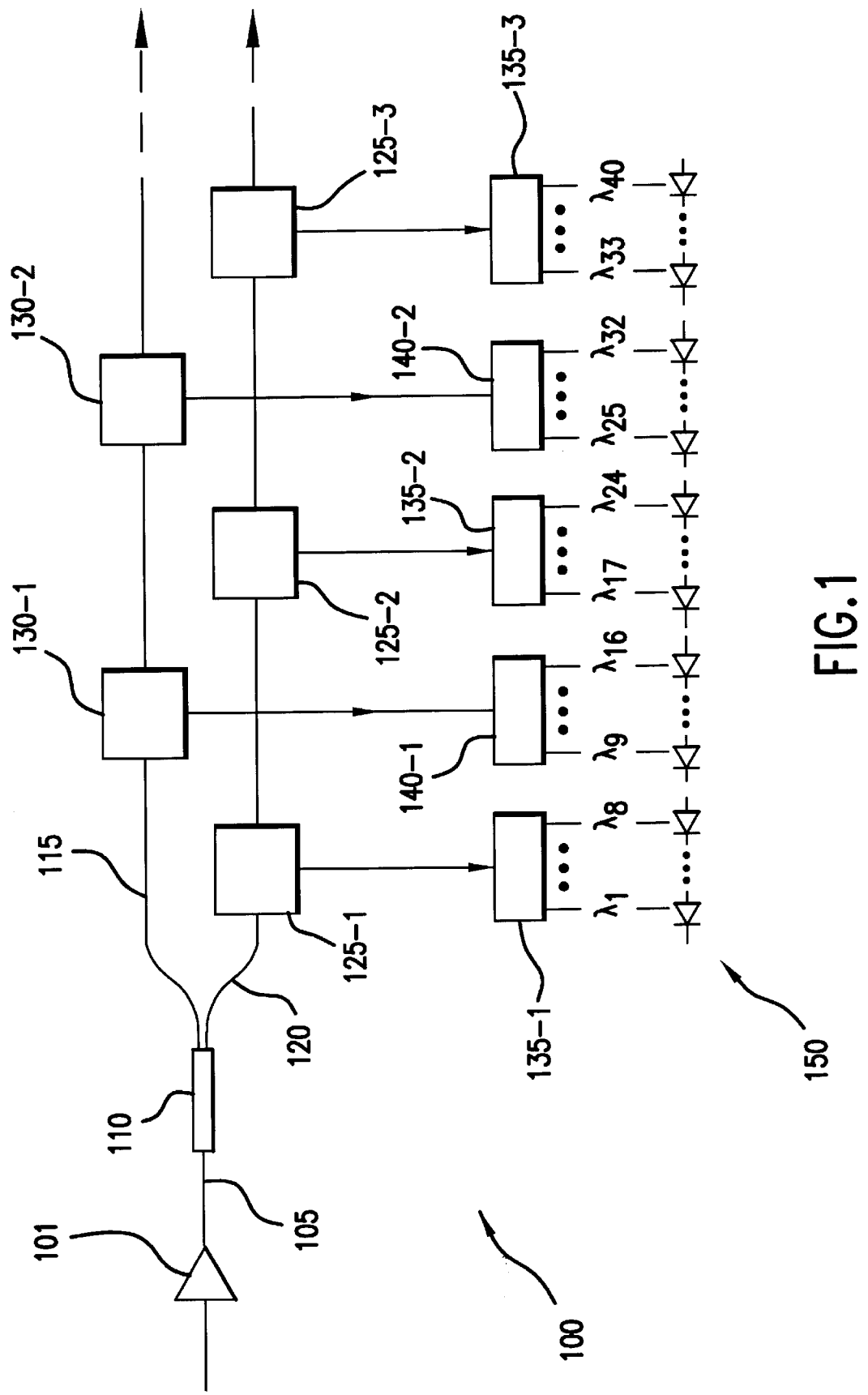
FIG. 1 illustrates a schematic diagram of an optical demultiplexer in accordance with the present invention.

Turning to the drawings in which like reference characters indicate the same or similar elements in each of the several views, FIG. 1 illustrates optical demultiplexer 100 consistent with the present invention. As discussed in greater detail below, the exemplary demultiplexer illustrated in FIG. 1 demultiplexes 40 channels. The present invention, however, is not limited to this number of channels. Rather, the present invention is applicable to demultiplexers that can separate any appropriate number of optical channels.

Returning to FIG. 1, optical demultiplexer 100 receives, for example, a plurality of multiplexed optical channels $\lambda_1$–$\lambda_{40}$ on input optical fiber 105. The multiplexed channels are emitted by laser transmitters (not shown) coupled to optical fiber 105. The multiplexed channels are supplied to the input of optical splitter 110, which supplies channels $\lambda_1$–$\lambda_{40}$ to first and second output fibers 115 and 120, respectively. Optionally, optical amplifier 101 may be provided at the input of coupler 110 in order to offset any loss introduced by splitter 110. Alternatively, the loss imposed by splitter 110 can be compensated by coupling optical amplifiers to output fibers 115 and 120.

As further shown in FIG. 1, first optical filtering elements 125-1 to 125-3 are coupled to first output fiber 120, and second filtering elements 130-1 and 130-2 are coupled to second output fiber 115. Each of these filtering elements typically includes an interference filter commercially available from JDS Fitel or DiCon, for example.

Figure 2:
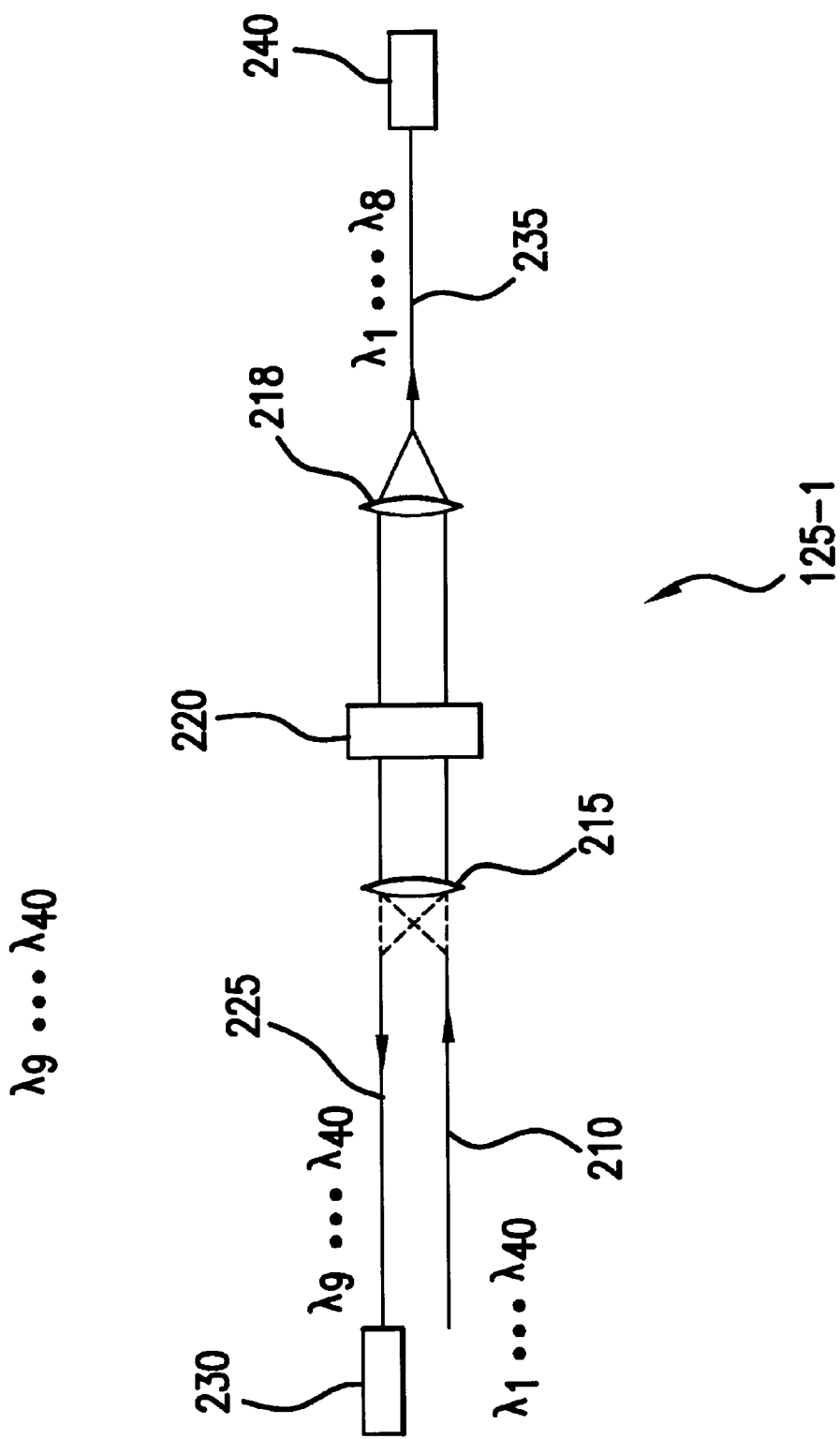
FIG. 2 illustrates a schematic diagram of an interference filter.

A simplified diagram of filtering element 125-1 incorporating an interference filter, for example, is illustrated in FIG. 2. Filtering element 125-1 receives channels $\lambda_1$–$\lambda_{40}$ on input fiber 210 having an end portion spaced from graded refractive index (GRIN) lens 215. As a result, light emitted from the end portion diverges prior to impinging on lens 215. Channels $\lambda_1$–$\lambda_{40}$ are collimated by lens 215 and directed toward dielectric thin film filter 220. Thin film filter 220 includes a substrate coated with a plurality of thin dielectric films of appropriate thickness and number to pass, in this case, channels $\lambda_1$–$\lambda_8$, and reflect channels $\lambda_{17}$–$\lambda_{40}$. Channels $\lambda_1$–$\lambda_8$ are thus transmitted to GRIN lens 218 where they are focused onto an end portion of output fiber 235 and transmitted to a corresponding sub-demultiplexer via output port 240 of filtering element 125-1. Channels $\lambda_9$–$\lambda_{40}$, however, are reflected back to GRIN lens 215, focused onto fiber 225 and output through port 230 to filtering element 125-2, which along with filtering element 125-3, typically has a similar construction as filtering element 125-1.

Figure 3:
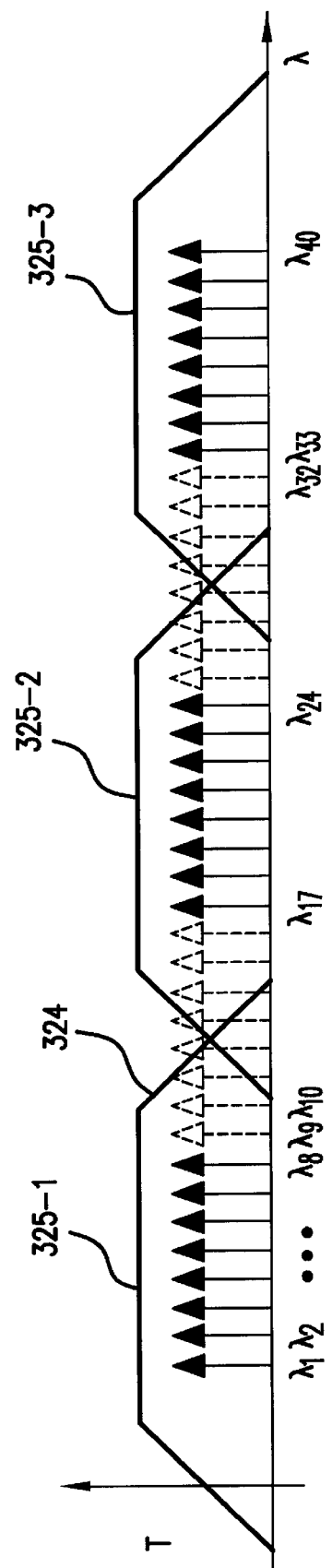
FIG. 3 illustrates transmittance characteristics of filtering elements 125-1, 125-2 and 125-3 shown in FIG. 1.

The transmittance vs. wavelength characteristics of filtering elements 125-1 to 125-3 are shown in FIG. 3. Transmittance band 325-1 of filtering element 125-1 has a relatively high transmittance over a range of wavelengths including the first eight channels, $\lambda_1$–$\lambda_8$. As noted above, therefore, these channels are transmitted toward an output port of filtering element 125-1. It should be noted, however, that channels $\lambda_9$–$\lambda_{11}$, for example, are also transmitted, but only partially, since they lie in the roll-off region 324 of transmittance band 325-1. Remaining channels $\lambda_{12}$–$\lambda_{40}$, as well as channels $\lambda_9$–$\lambda_{11}$ at a substantially reduced power level, are reflected to filtering element 125-2 having high transmittance band 325-2. As a result, channels $\lambda_{17}$–$\lambda_{24}$ are transmitted toward the output port of filtering element 125-2. As further shown in FIG. 3, however, channels $\lambda_{25}$–$\lambda_{27}$, for example, adjacent $\lambda_{17}$–$\lambda_{24}$ are also transmitted, but to a lesser extent. Remaining channels $\lambda_{28}$–$\lambda_{40}$ are reflected and output to filtering element 125-3 of which channels $\lambda_{33}$–$\lambda_{40}$ fall within high transmittance band 325-3 and are thus passed to an output port of filtering element 125-3. Channels $\lambda_{28}$–$\lambda_{31}$, however, are partially transmitted.

As further shown in FIG. 1, channel groups $\lambda_1$–$\lambda_8$, $\lambda_{17}$–$\lambda_{24}$, and $\lambda_{33}$–$\lambda_{40}$ are respectively directed to sub-demultiplexers 135-1, 135-2 and 135-3 where further demultiplexing is performed to output individual channels on corresponding output ports. These output ports, in turn, are coupled to respective ones of photodiodes 150 where the channels are converted into electrical signals for processing by appropriate circuitry (not shown). The term sub-demultiplexer is used herein to describe an optical apparatus that demultiplexes the groups of channels respectively output from the filtering elements. Sub-demultiplexers 135-1, 135-2 and 135-3 are discussed in greater detail below.

As noted above, channels lying outside the high transmittance bands of filtering elements 125-1, 125-2 and 125-3 are only partially reflected due to the relatively broad roll-off regions of the transmittance characteristics of interference filters, for example. Accordingly, channels adjacent the intended channel sub-groups incur a significant amount of power loss and cannot be effectively demultiplexed. These channels are therefore supplied by filtering elements 130-1 and 130-2 coupled to second output fiber 115, as discussed in greater detail below with reference to FIG. 4.

Figure 4:
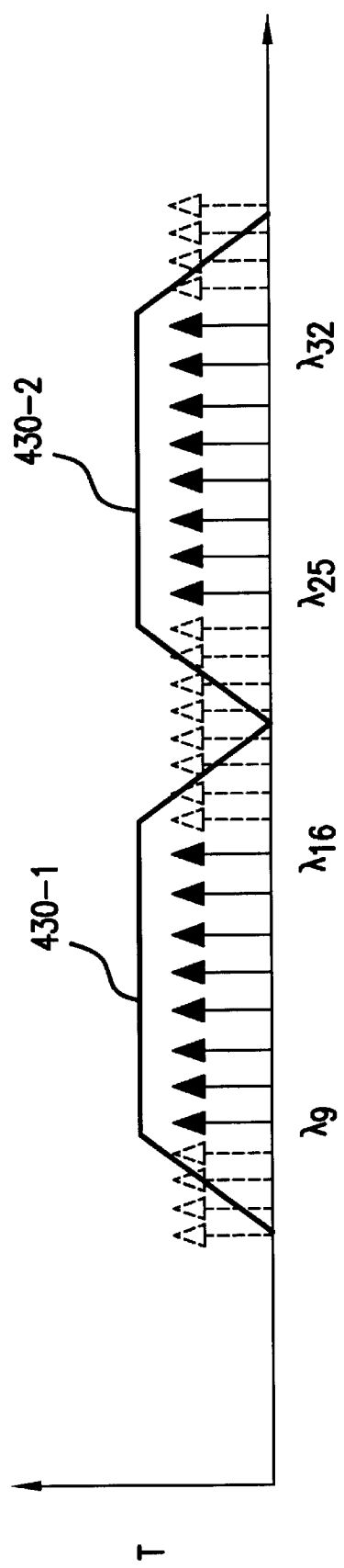
FIG. 4 illustrates transmittance characteristics of filtering elements 130-1 and 130-2 shown in FIG. 1.

As shown in FIG. 4, filtering element 130-1 has high transmittance band 430-1 extending over wavelengths $\lambda_9$–$\lambda_{16}$. Filtering element 130-1 typically has a similar construction to filtering element 125-1, and therefore transmits channels $\lambda_9$–$\lambda_{16}$ for output to corresponding sub-demultiplexer 140-1 and further demultiplexing. Remaining channels $\lambda_1$–$\lambda_8$ and $\lambda_{17}$–$\lambda_{40}$ are reflected to filtering element 130-2 having high transmittance band 430-2 encompassing channels $\lambda_{25}$–$\lambda_{32}$. Accordingly, channels $\lambda_{25}$–$\lambda_{32}$ are transmitted through filtering element 130-2 and directed toward sub-demultiplexer 140-2 for further demultiplexing into individual channels.

Channels lying adjacent the high transmitttance bands 430-1 and 430-2, like those channels discussed previously adjacent high reflectance bands 325-1 to 325-3, are partially transmitted by filtering elements 130-1 and 130-2 and are thus difficult to detect after further demultiplexing. These channels, however, lie within the high transmittance bands of filtering elements 125-1 to 125-3 and are thus demultiplexed through sub-demultiplexers 135-1 to 135-3, respectively, as noted above. Therefore, in the presently described example of the present invention, first output fiber 120, filtering elements 125-1 to 125-3 and corresponding sub-demultiplexers 135-1 to 135-3, serve to demultiplex channels $\lambda_1$–$\lambda_8$, $\lambda_{17}$–$\lambda_{24}$ and $\lambda_{33}$–$\lambda_{40}$, respectively. Additionally, second output fiber 120, filtering elements 130-1 and 130-2 and corresponding sub-demultiplexers 140-1 and 140-2 serve to demultiplex channels $\lambda_9$–$\lambda_{16}$ and $\lambda_{25}$–$\lambda_{32}$, respectively. Accordingly, alternating groups of channels are respectively selected by filtering elements 125-1 to 125-3 and 135-1 to 135-3.

Alternatively, if only 40 channels are to be separated by the demultiplexer in accordance with the present invention, filtering elements 130-2 and 125-3 can be omitted and sub-demultipelxers 140-2 and 135-3 can be coupled directly to the outputs of filtering elements 130-1 and 125-2, respectively.

Filtering elements 125-1 to 125-3, 130-1 and 130-2 introduce little power loss to the selected sub-groups of channels. For example, the power loss associated with the channels reflected by the filtering elements is typically about 0.5 dB, and the loss associated with the channels transmitted through the filtering elements is about 0.7 dB. Thus, the overall loss of the demultiplexer in accordance with the present invention is significantly reduced.

It is noted that as the channels propagate down one of output fibers 115 or 120 in FIG. 1, the transmission loss through each filtering element can accumulate. However, since the loss associated with each filtering element is so low, channels can pass through four filtering elements along one of output fibers 115 and 120, and incur less than 3 dB of loss. Accordingly, additional channels can be demultiplexed with little additional loss simply by concatenating additional filtering elements with fiber patch cord, for example, between adjacent couplers. Alternatively, filtering elements can be easily added by coupling the output of one filtering element to one end of an optical fiber via a first fiber optic coupler and coupling the other end of the optical fiber to another filtering element via a second fiber optic coupler. Thus, the demultiplexer in accordance with the present invention is readily expandable and upgradeable to accommodate more channels with minimal expense and relatively little loss.

Figure 5:
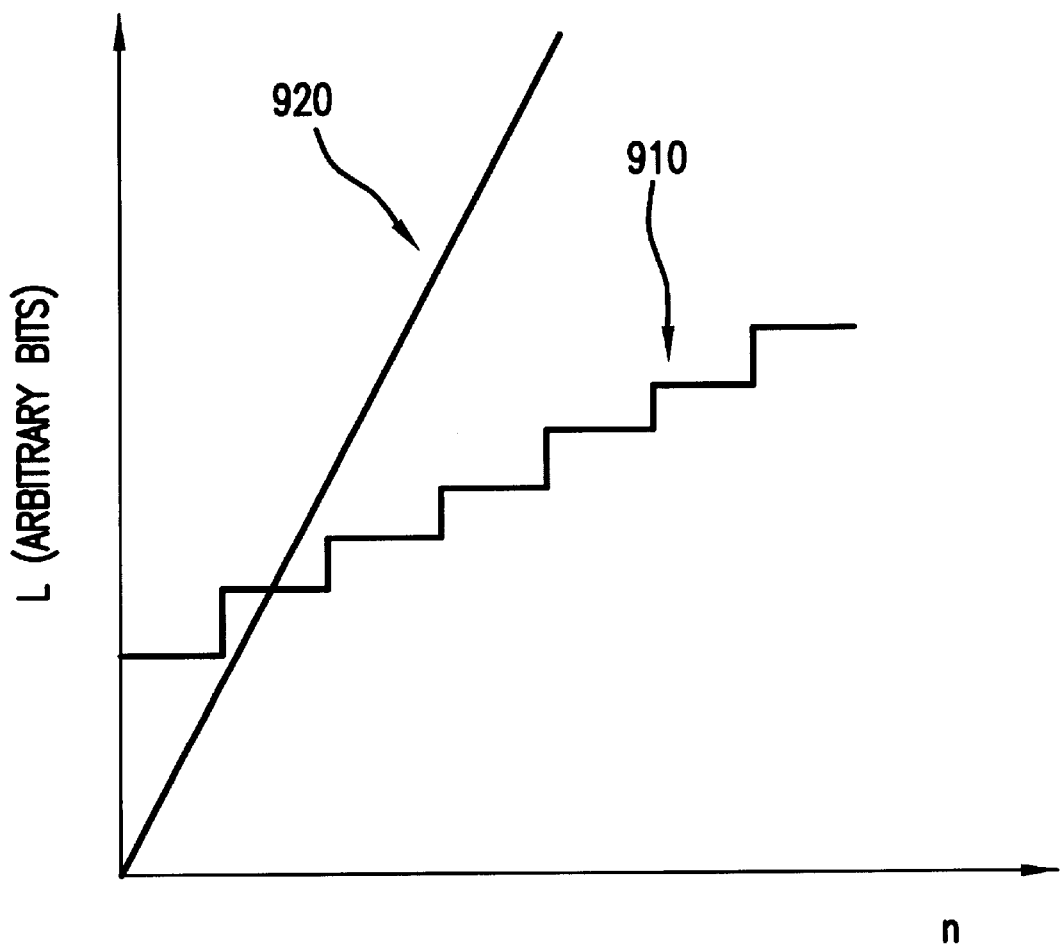
FIG. 5 illustrates plots of loss vs. channel count for the present invention and a conventional demultiplexer.

FIG. 5 illustrates loss L as a function of channel count n in accordance with the present invention (curve 910) and a conventional 1×n splitter based demultiplexer (curve 920). As seen in FIG. 5, at low channel counts, the loss associated with the present invention is higher than the conventional demultiplexer. This is due to the loss introduced by the 1×2 splitter 110, which imposes a minimum loss in the demultiplexer. At higher channel counts, however, the loss associated with the conventional demultiplexer increases linearly with n (curve 920). On the other hand, the loss associated with the present invention (curve 910) is stepped and increases at a much more gradual rate due, at least in part, to the low loss of the filtering elements. Therefore, at higher channel counts, channels demultiplexed in accordance with the present invention experience less loss than those demultiplexed with a conventional 1×n splitter.

Figure 6:
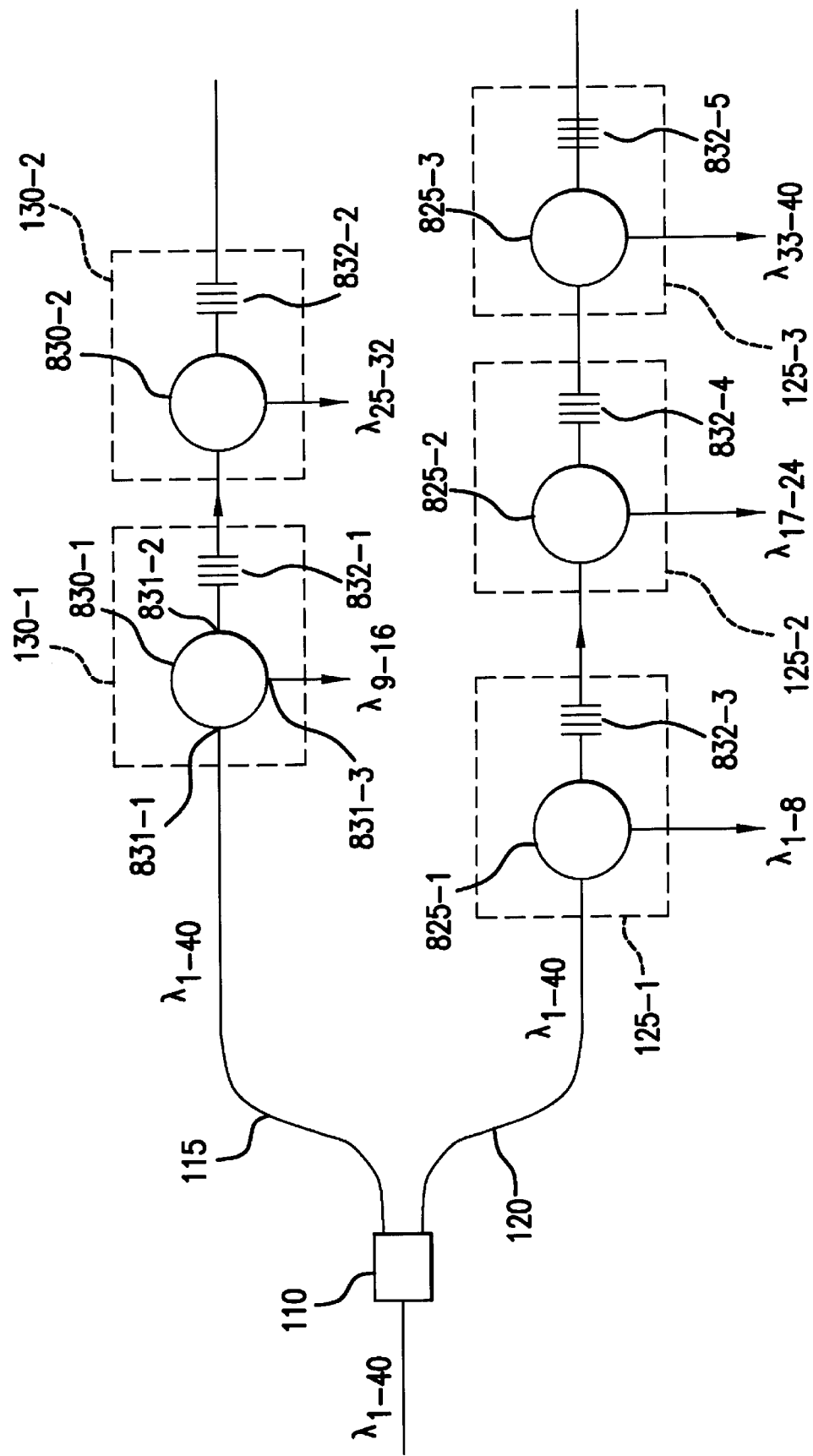
FIG. 6 illustrates an additional embodiment of the present invention.

FIG. 6 illustrates an alternative embodiment in which each filtering element constitutes a combination of a circulator and grating. In particular, filtering element 130-1 includes a circulator 830-1 receiving channels $\lambda_{1\text{-}40}$ at a first circulator port 831-1 coupled to output fiber 115. These channels are circulated to port 831-2 and output to in-fiber Bragg grating 832-1, which is configured to have a high reflectivity band that coincides with the band of channels $\lambda_{9\text{-}16}$. Accordingly, channels $\lambda_{9\text{-}16}$ are reflected back to port 831-2 while the remaining channels are transmitted to circulator 830-2. Channels $\lambda_{9\text{-}16}$ are then circulated to output port 831-3 and supplied to a corresponding sub-demultiplexer. In a similar fashion circulators 830-2, 825-1, 825-2 and 825-3 output channel groups $\lambda_{25\text{-}32}$, $\lambda_{1\text{-}8}$, $\lambda_{17\text{-}24}$ and $\lambda_{33\text{-}40}$ in conjunction with in-fiber Bragg gratings 832-2, 832-3, 832-4, and 832-5, respectively.

Typically, in-fiber Bragg gratings 832-3, 832-4 and 832-5 reflect successively lower bands or wavelengths, such that the wavelengths in channel group $\lambda_{1\text{-}8}$ are greater than the wavelengths in channel group $\lambda_{17\text{-}24}$, and the wavelengths in channel group $\lambda_{17\text{-}24}$ are greater than the wavelengths in channel group $\lambda_{33\text{-}40}$. Further, in-fiber Bragg gratings 831-1 and 832-2 reflect successively lower bands of wavelengths. As a result, the demultiplexer shown in FIG. 6 avoids cladding or radiation mode loss.

Examples of sub-demultiplexers will next be described with reference to FIGS. 7–10. Although exemplary configurations are discussed in detail with respect to sub-demultiplexer 133-1, it is understood that the remaining sub-demultiplexers described above can have a similar structure. Moreover, the present invention is not limited to these specific sub-demultiplexer configurations nor the specific number of inputs and outputs disclosed. Rather, it is understood that any optically demultiplexing component capable of demultiplexing a group of channels can be used.

Figure 7:
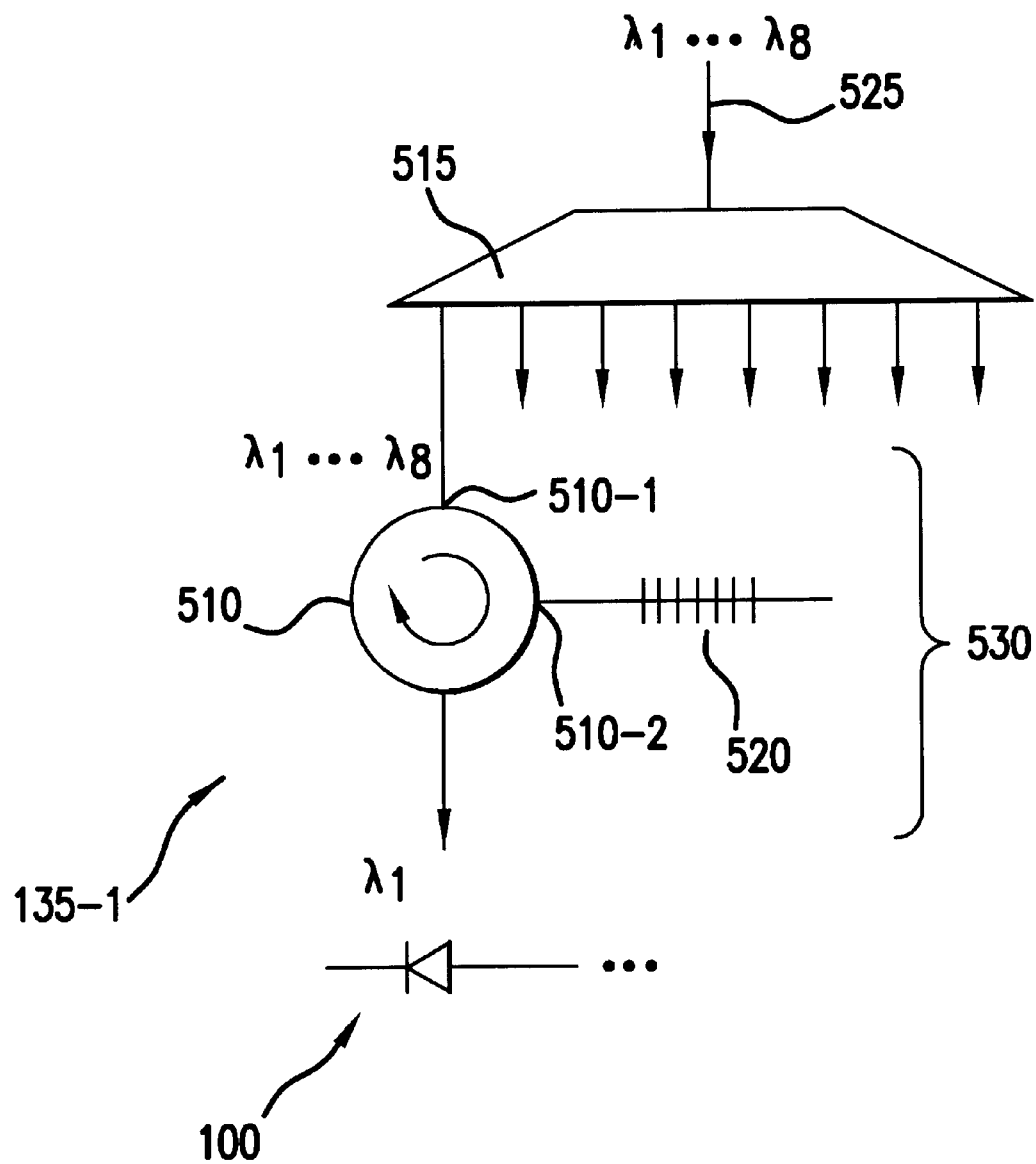
FIG. 7 illustrates an example of a sub-demultiplexer.

FIG. 7 illustrates a first exemplary construction of sub-demultiplexer 133-1. As shown in FIG. 7, sub-demultiplexer 133-1 receives channels $\lambda_1$–$\lambda_8$ at an input 525 of a 1×8 splitter 515, commercially available from IOT, for example. Splitter 515 has eight outputs, each of which supplying channels $\lambda_1$–$\lambda_8$ to a corresponding one of eight optical selectors 530. Splitter 515, as well as splitter 110, may include a waveguide doped with an optically active material, such as erbium. Such a waveguide may further be optically pumped so that splitter 515 has reduced loss or provides optical gain.

In FIG. 7, only one of the selectors is shown including a three port circulator 510 having a first port 510-1 for receiving channels $\lambda_1$–$\lambda_8$ from one of the outputs of splitter 515. These channels are transmitted to in-fiber Bragg grating 520 via second port 510-2 of circulator 510. Typically, in-fiber Bragg grating 520 has a reflectance characteristic as a function of wavelength such that a reflectivity maximum is obtained at a desired channel or wavelength, e.g., $\lambda_1$. Thus, only channel $\lambda_1$ is reflected back to second port 510-2 and circulated to third circulator port 510-3, which outputs channel $\lambda_1$ to one of photodiodes 150 for subsequent detection and further processing. Likewise, the in-fiber Bragg gratings in the remaining selectors have reflectivity maxima that respectively reflect a corresponding one of each of remaining wavelengths $\lambda_2$–$\lambda_8$ for output to one of photodiodes 150.

Figure 8:
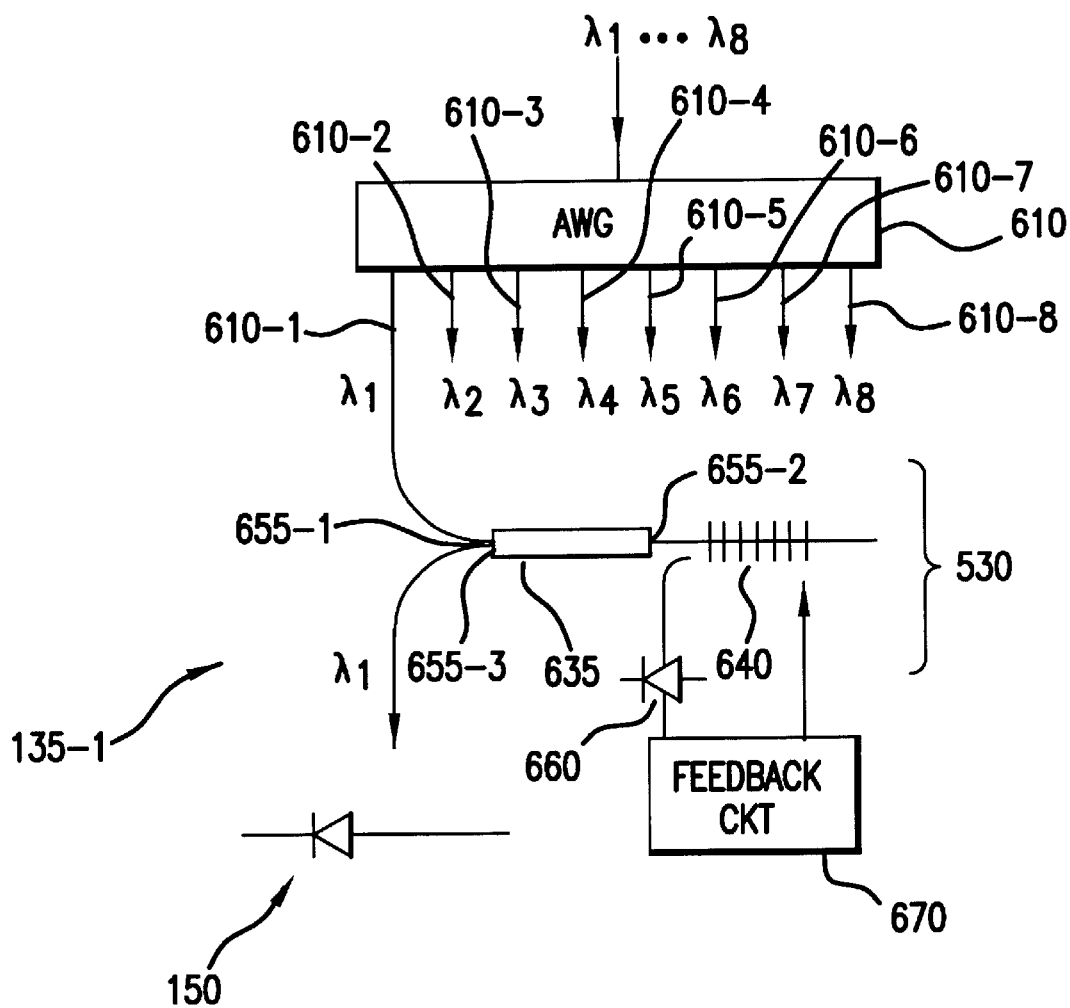
FIG. 8 illustrates an additional example of a sub-demultiplexer.

FIG. 8 illustrates an alternative construction for sub-demultiplexer 133-1. Here, the channel group $\lambda_1$–$\lambda_8$ is supplied to a planar arrayed waveguide grating (AWG) 610 or dielectric thin film demultiplexer, which supplies a respective channel on each of outputs 610-1 to 610-8. If the spacing between adjacent ones of channels $\lambda_1$–$\lambda_8$ is relatively narrow, AWG 610 can introduce an unacceptably high level of undesired cross-talk. Accordingly, additional filtering may be required. Thus, a selector 630 is further illustrated in FIG. 8 to isolate a single channel, e.g., $\lambda_1$, and remove any cross-talk. In this case, selector 630 includes a coupler 655 receiving substantially channel $\lambda_1$ at a first port 655-1. The input light is next supplied to in-fiber Bragg grating 640 through second port 655-2. In-fiber Bragg grating 640 substantially reflects only channel $\lambda_1$, while passing other wavelengths. Thus, channel $\lambda_1$ is reflected back to second port 655-2 and output to one of photodiodes 150 via third output port 655-3 of coupler 655.

As further shown in FIG. 8, feedback circuit 670 is optionally provided to insure that grating 640 reflects at the intended wavelengths. As is generally understood, an in-fiber Bragg grating typically includes a periodic variation of index of refraction, with the spacing between refractive index peaks defining, in part, the wavelength to be reflected by the grating. Variations in the wavelength of light reflected by grating 640 can be sensed with photodiode 660, which supplies an electrical signal to a feedback circuit 670. Feedback circuit 670, in turn, generates an appropriate voltage signal to adjust a temperature regulator coupled to grating 640. Since the grating refractive index spacing changes with temperature, the temperature of the grating is set by feedback circuit 670 to alter the grating spacing so that grating 640 reflects a desired wavelength.

Figure 9:
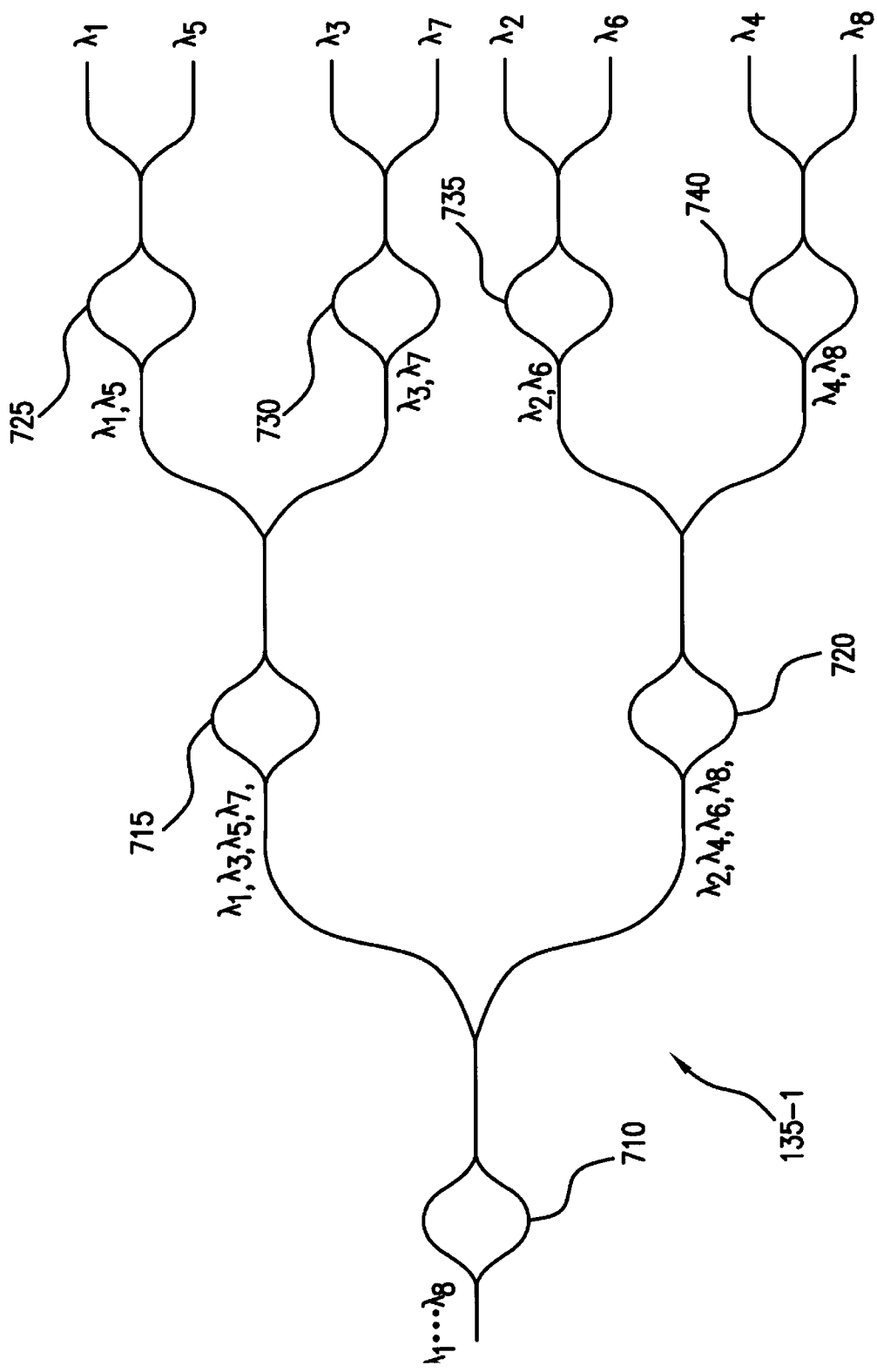
FIG. 9 illustrates a further example of a sub-demultiplexer.

FIG. 9 illustrates a further exemplary construction of sub-demultiplexer 133-1. In this instance, sub-demultiplexer 133-1 comprises a plurality of Mach-Zehnder interferometers. It is known that Mach-Zehnder interferometers, which include optical waveguides of varying lengths, can be used to separate wavelengths (see for example, published European Patent Application EP0482461). Accordingly, as shown in FIG. 9, Mach-Zehnder interferometers can be cascaded to separate a group of wavelengths. For example, Mach-Zehnder interferometer 710 separates input channels $\lambda_1$–$\lambda_8$ into sub-groups of channels $\lambda_{1,3,5,7}$ and $\lambda_{2,4,6,8}$, respectively. Channel sub-group $\lambda_{1,3,5,7}$ is supplied to Mach-Zehnder interferometer 715 and channel sub-group $\lambda_{2,4,6,8}$ is supplied to Mach-Zehnder interferometer 720. As further shown in FIG. 9, Mach-Zehnder interferometers 715 and 720 further break down these channel sub-groups to channel pairs $\lambda_{1,5}$, $\lambda_{3,7}$, $\lambda_{2,6}$, and $\lambda_{4,8}$, which are further demultiplexed into individual channels by Mach-Zehnder interferometers 725, 730, 735 and 740, respectively.

Figure 10:
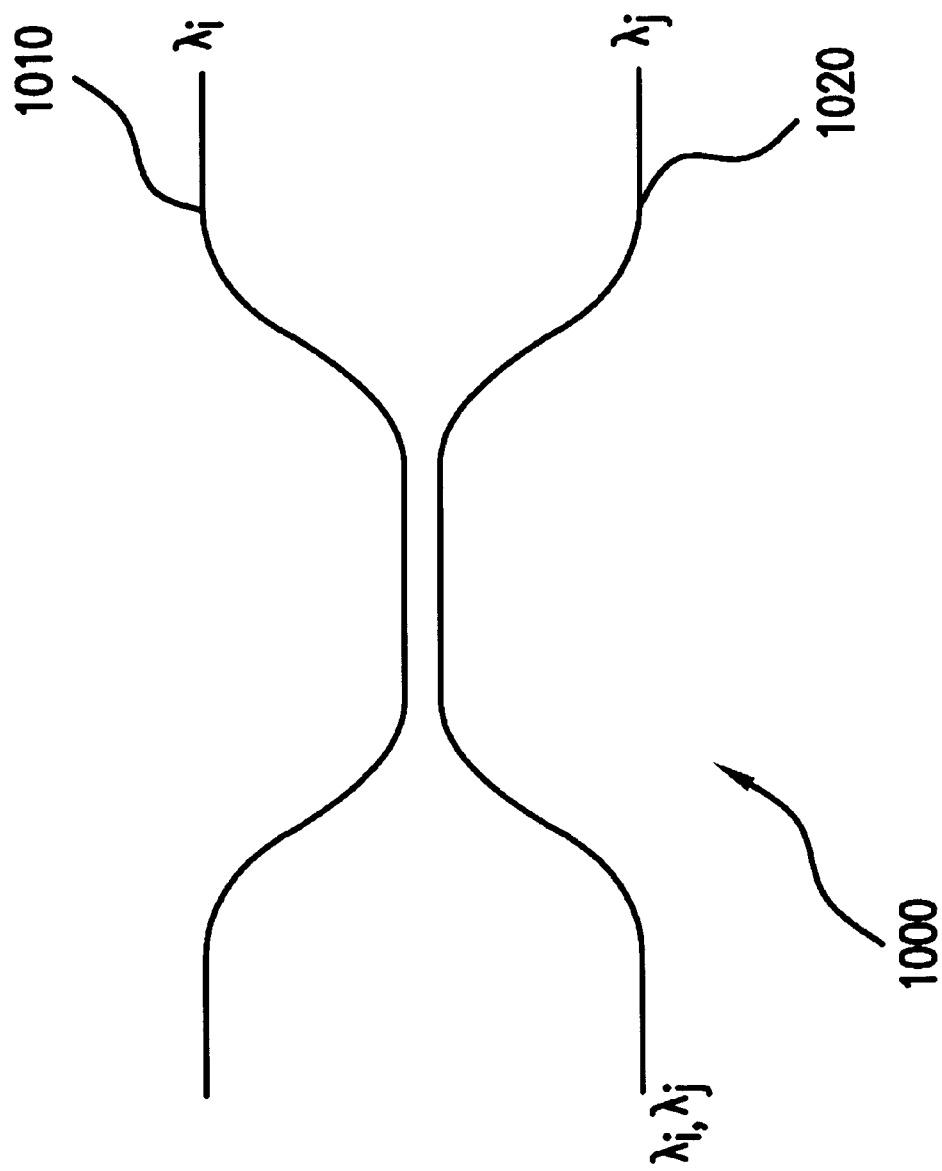
FIG. 10 illustrates a fiber optic coupler demultiplexer for separating two wavelengths.

Fiber optical couplers, commercially available from Applied Fiber Optics, Inc. and Gould, for example, can also be used to demultiplex the groups of channels supplied by the filtering elements. Fiber optic coupler 1000 is illustrated in FIG. 10 in which two wavelengths $\lambda_i$ and $\lambda_j$, are separated and supplied on respective outputs 1010 and 1020. A plurality of such fiber optic couplers can be cascaded in a manner similar to that shown in FIG. 9 to thereby demultiplex a plurality of wavelengths within a given group of channels. If necessary, selectors 530 or 630 may be provided at the outputs of Mach-Zehnder interferometers 725, 730, 735 and 740 of FIG. 7, or at the outputs of the cascaded fiber optic couplers 1000, in order to reject any extraneous wavelengths, e.g., cross-talk.

Figure 11:
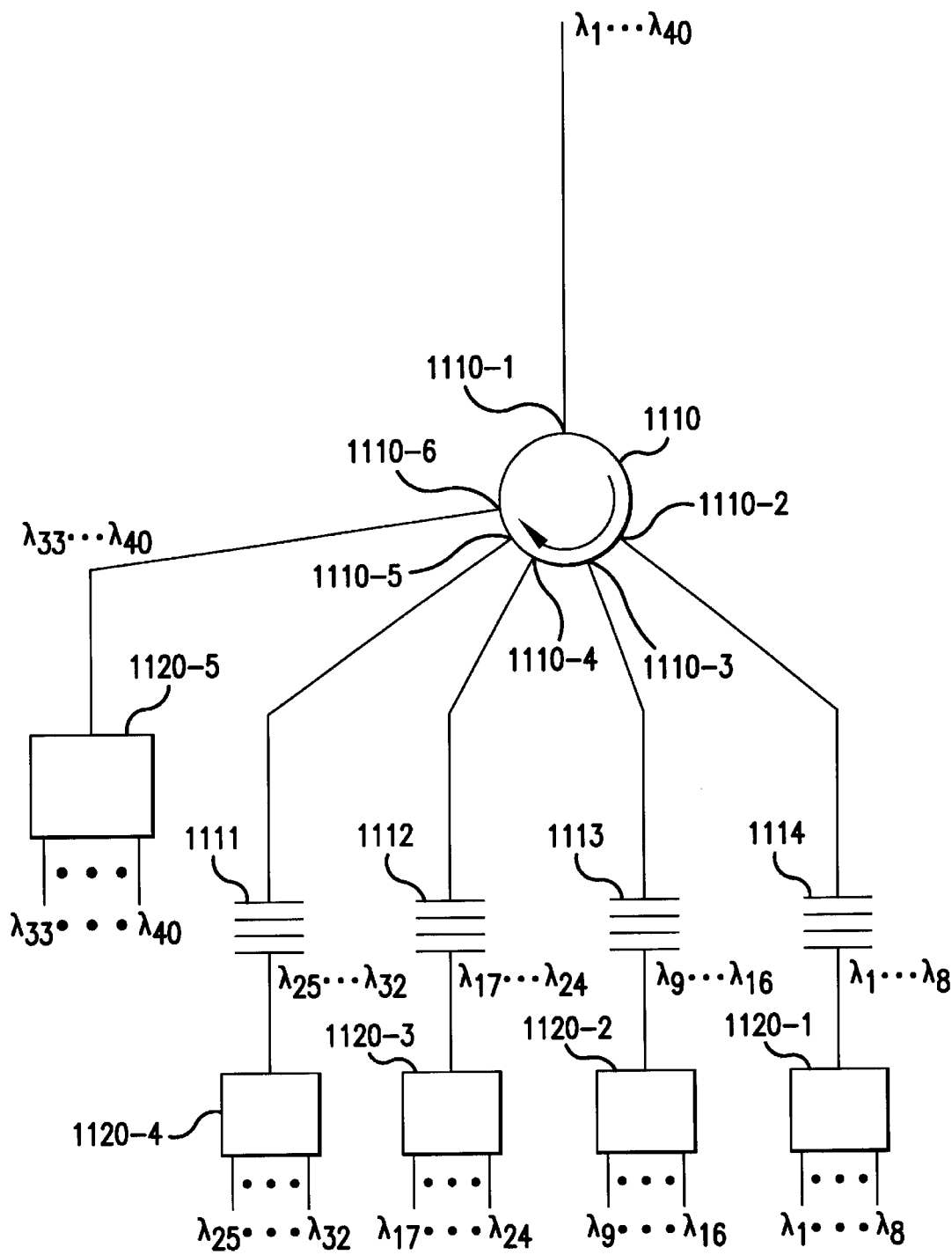
FIG. 11 illustrates an additional embodiment of the present invention.

FIG. 11 shows an alternative embodiment of the present invention, whereby splitter 110 and filtering elements 125-1 to 125-3, 135-1 and 135-2 are replaced by five port circulator 1110 and in-fiber Bragg gratings 1111 to 1114. Channels $\lambda$1-40 are supplied to a first port 1110-1 of circulator 1110 and are output through port 1110-2. In-fiber Bragg grating 1114 is configured to transmit channels $\lambda_{1-8}$ and reflect channels $\lambda_{9-40}$. Accordingly, channels $\lambda_{1-8}$ are supplied to sub-demultiplexer 1120-1 for further demultiplexing while channels $\lambda_{9-40}$ are reflected back to second port 1110-2 and output to port 1110-3. In-fiber Bragg grating 1113, which is coupled to second port 1110-3, is configured to reflect channels $\lambda_{17-40}$ and transmit channels $\lambda_{9-16}$. As a result, channels $\lambda_{9-16}$ are passed to sub-demultiplexer 1120-2 for further demultiplexing and channels $\lambda_{17-40}$ are reflected back to port 1110-3 and output through port 1110-4.

In-fiber Bragg gratings 1112 and 1111, coupled to corresponding ports 1110-4 and 1110-5, are configured to transmit channel groups $\lambda_{17-24}$ and $\lambda_{25-32}$, respectively, and reflect the remaining channels. Thus, channel groups $\lambda_{17-24}$ and $\lambda_{25-32}$ are selected in a manner similar to that described above, and supplied to corresponding sub-demultiplexers 1120-3 and 1120-4 for further demultiplexing. In addition, channels $\lambda_{33-40}$ are output through port 1110-6 and supplied to sub-demultiplexer 1120-5 for further demultiplexing. Typically, sub-demultiplexers 1120-1 to 1120-5 have a structure similar to that shown in FIG. 7.

Figure 12:
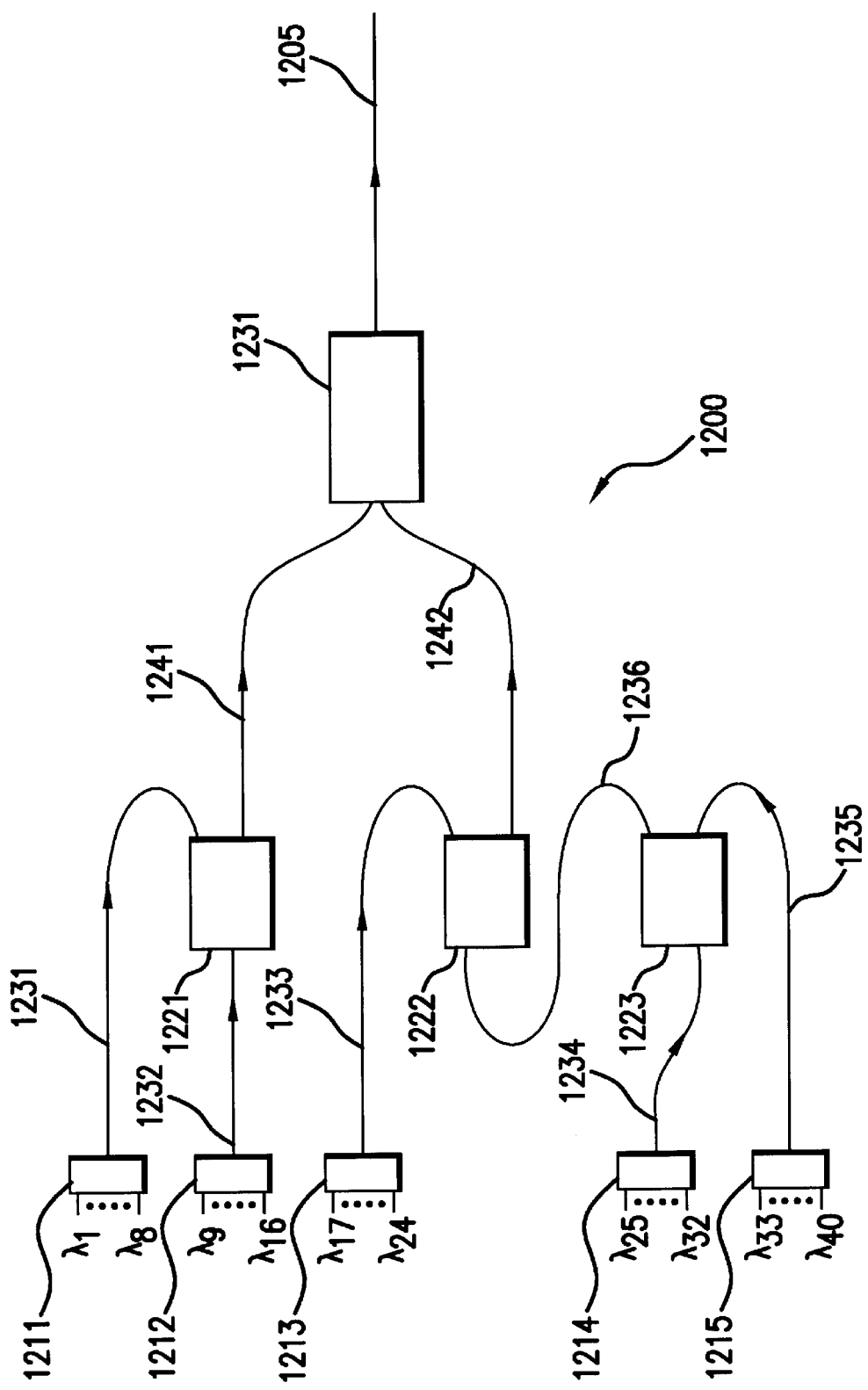
FIG. 12 illustrates an optical multiplexer in accordance with an aspect of the present invention.

FIG. 12 illustrates optical multiplexer 1200 in accordance with the present invention for multiplexing forty channels onto a single fiber 1205. As seen in FIG. 12, each channel input to multiplexer 1200 is supplied on a respective input optical communication path or line to one of optical combiners 1211 to 1215. Optical combiners 1211 to 1215 can be similar to optical splitter 515, but with the inputs and outputs reversed. As further shown in FIG. 12, combiner 1211 receives channels $\lambda_1$–$\lambda_{28}$ on respective input lines and combines these channels as a channel group onto a single output line 1231. Likewise, channel groups $\lambda_9$–$\lambda_{16}$, $\lambda_{17}$–$\lambda_{24}$, $\lambda_{25}$–$\lambda_{32}$, and $\lambda_{33}$–$\lambda_{40}$ are output from combiners 1212, 1213, 1214 and 1215 on lines 1232, 1233, 1234 and 1235, respectively. Lines 1231 and 1232 are fed to an additional combiner such as a filtering element 1221, commercially available from JDS Fitel or E-Tek, for example, for combining channel groups $\lambda_1$–$\lambda_8$ and $\lambda_9$–$\lambda_{16}$ onto line 1241. Lines 1234 and 1235 are coupled to filtering element 1223, which combines $\lambda_{25}$–$\lambda_{32}$ and $\lambda_{33}$–$\lambda_{40}$ onto a single line 1236, and lines 1233 and 1236 are fed to filtering element 1222, which combines channel groups $\lambda_{17}$–$\lambda_{24}$, $\lambda_{25}$–$\lambda_{32}$, $\lambda_{33}$–$\lambda_{40}$ onto a single line 1242. Lines 1241 and 1242 are connected to coupler 1231, similar in construction to splitter 110 but having the inputs and outputs reversed, for combining channel groups $\lambda_1$–$\lambda_8$, $\lambda_9$–$\lambda_{16}$, $\lambda_{17}$–$\lambda_{24}$, $\lambda_{25}$–$\lambda_{32}$, and $\lambda_{33}$–$\lambda_{40}$ onto line 1205.

Optical multiplexer 1200 is readily expandable by adding additional combiners and filtering elements.

Figure 13:
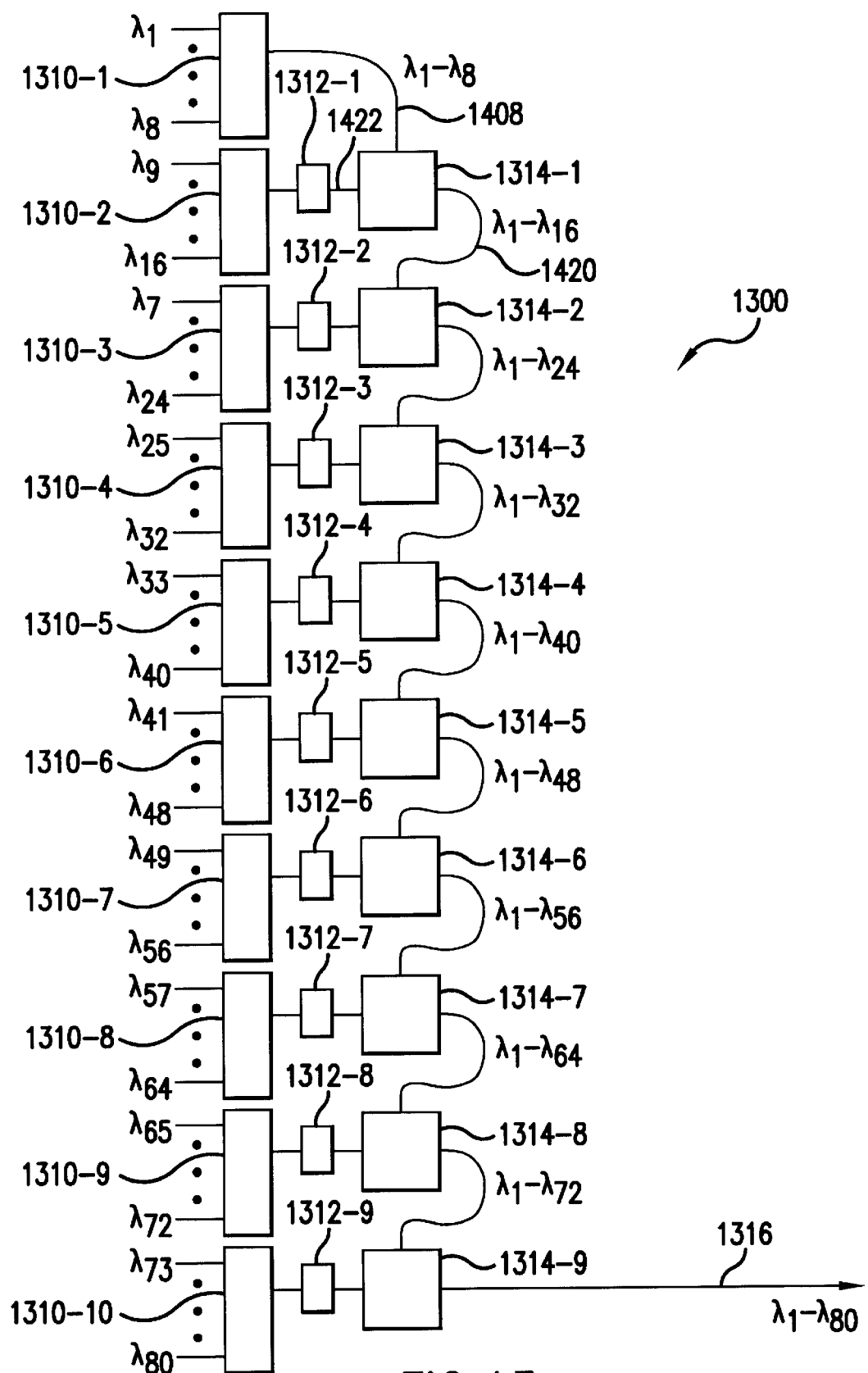
FIG. 13 illustrates an optical multiplexer in accordance with a further aspect of the present invention.

FIG. 13 illustrates an alternative optical multiplexer 1300, in accordance with a further aspect of the present invention, which can also multiplex a relatively large number of channels. Optical multiplexer 1300 is shown multiplexing 80 channels, but any appropriate number of channels can be suitably multiplexed with the multiplexer in accordance with the present invention.

Multiplexer 1300 includes a plurality of conventional 1×8 combiners 1310-1 to 1310-10, for example, each having eight inputs receiving a respective one of eight channels. Combiners 1310-1 to 1310-10 can include one or more of the following: dielectric filters, fiber couplers, planar waveguides, arrayed waveguide routers, and appropriate combinations of fiber Bragg gratings and circulators. Combiners 1310-1 to 1310-10 combine the received channels onto corresponding outputs, which are coupled to respective optical attenuators 1312-1 to 1312-9. A series of cascaded combiners, including for example optical filter elements 1314-1 to 1314-9, generally receive optical signal inputs from corresponding optical attenuators 1312-1 to 1314-9, and add these signals to signals input from a preceding optical filter element. In particular, filter element 1314-1 adds channels $\lambda_1$ to $\lambda_8$ received from combiner 1310-1 and channels $\lambda_9$ to $\lambda_{16}$ output from combiner 1310-2 via attenuator 1312-1. The aggregated channels, channels $\lambda_1$ to $\lambda_{16}$, are passed to filtering element 1314-2, which adds channels $\lambda_{17}$ to $\lambda_{24}$ output from attenuator 1312-2 thereto. In a similar fashion channel groups $\lambda_{25}$ to $\lambda_{32}$, $\lambda_{33}$ to $\lambda_{40}$, $\lambda_{41}$ to $\lambda_{48}$, $\lambda_{56}$ to $\lambda_{64}$, and $\lambda_{72}$ to $\lambda_{80}$ are successively added by filters 1314-3 to 1314-9. The final filtering element stage 1314-9 outputs the entire aggregation of channels, $\lambda_1$ to $\lambda_{80}$ onto a single output fiber 1316.

Figure 14:
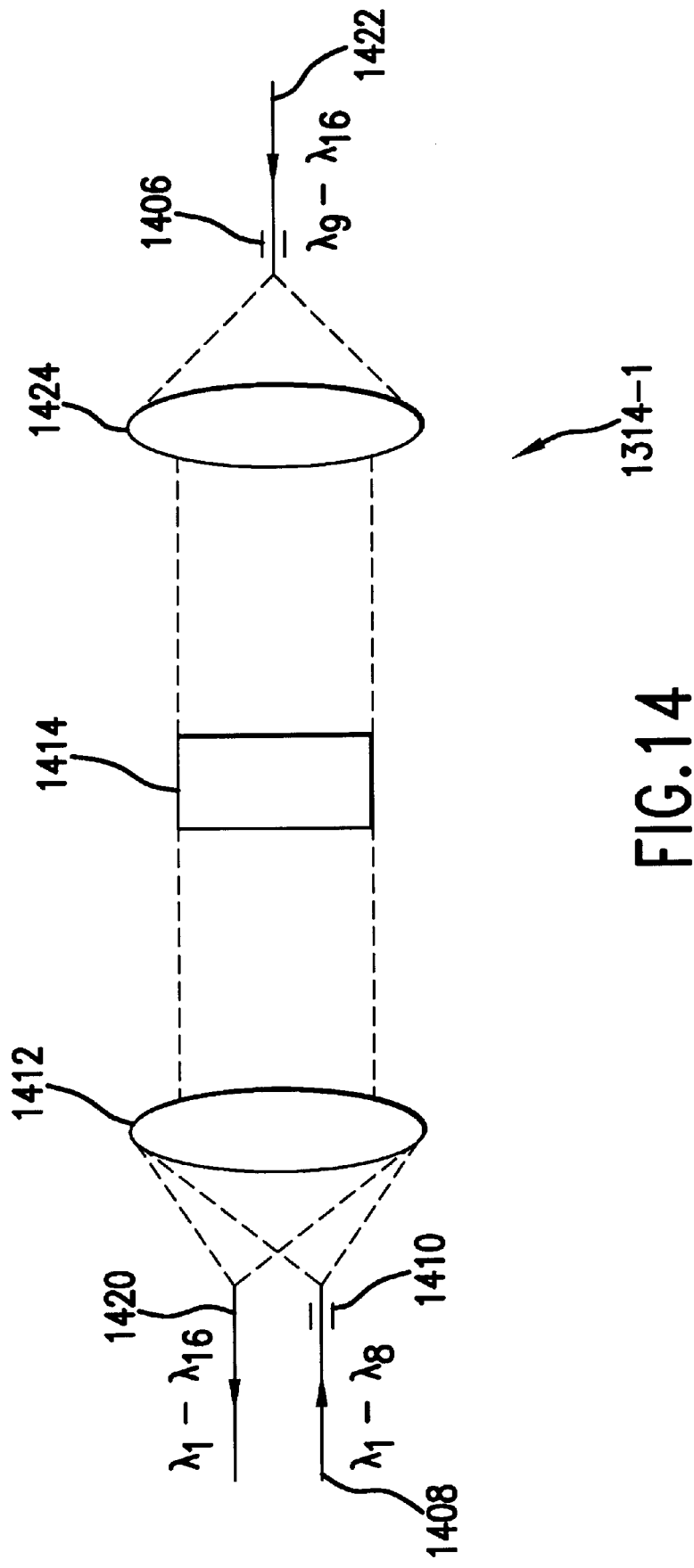
FIG. 14 illustrates a filtering element shown in FIG. 13.

An exemplary filtering element 1314-1 is illustrated in greater detail in FIG. 14. Filtering element 1314-1 has a similar construction as that shown in FIG. 2. For example, channels $\lambda_9$ to $\lambda_{16}$ are added to channels $\lambda_1$ to $\lambda_8$ by supplying channels $\lambda_9$ to $\lambda_{16}$ through port 1406 and channels $\lambda_1$ to $\lambda_8$ through port 1410. Channels $\lambda_9$ to $\lambda_{16}$ are emitted from an end of fiber 1422, collimated by lens 1424 and transmitted through dielectric filter 1414. Dielectric filter 1414 typically includes a transparent substrate coated with a plurality of dielectric layers configured to transmit, in this case, a band of wavelengths including channels $\lambda_9$ to $\lambda_{16}$ to lens 1412. Channels $\lambda_9$ to $\lambda_{16}$ are then focused onto an end of output fiber 1420. Channels $\lambda_1$ to $\lambda_8$, however, are emitted from an end of fiber 1408, collimated by lens 1412, and reflected dielectric filter 1414, which reflects wavelengths outside the $\lambda_9$ to $\lambda_{16}$ band. Channels $\lambda_1$ to $\lambda_8$ are next focused onto the end of output fiber 1420, and are thus added with channels $\lambda_9$ to $\lambda_{16}$.

Channels $\lambda_1$ to $\lambda_8$, however, incur a loss when combined with channels $\lambda_9$ to $\lambda_{16}$ in filtering element 1314-1, and experience further loss when combined with remaining channels $\lambda_{17}$ to $\lambda_{72}$ in filtering elements 1314-2 to 1314-9. Likewise, channels $\lambda_9$ to $\lambda_{72}$ accumulate varying degrees of loss when output from combining filters 1314-2 to 1314-9. Thus, in the absence of attenuators 1312-1 to 1312-9, channels output from multiplexer 1300 have unequal optical power. In WDM systems, however, substantially uniform channel power is desirable, because optical amplifiers downstream from the multiplexer may otherwise substantially degrade the optical signal-to-noise ratio of the low power channels. In addition, noise in a receiver can adversely affect detection of low power signals.

In order to insure, therefore, that each channel output from multiplexer 1300 has substantially the same optical power, attenuators 1312-1 to 1312-9 are provided to impose an additional loss on channels input to filtering elements 1314-1 to 1314-9. The amount of attenuation for each attenuator is typically selected based on the number of filtering elements separating the attenuator from output fiber 1316. For example, the attenuation of attenuator 1312-1 is less than that of attenuators 1312-2 to 1312-9 because optical signals passing through attenuator 1312-1 will incur further loss passing through filtering elements 1314-2 to 1314-9. In contrast, since optical signals output from combiner 1310-10 do not pass through a series of dielectric filters and thus experience relatively little loss, the attenuation associated with attenuator 1312-9 is greater than that of the remaining attenuators so that substantially uniform optical power can be achieved for each channel output on fiber 1316. Optionally, an attenuator may be provided at the output of combiner 1310-1, if necessary.

Optical attenuator 1312-1 will next be described with reference to FIGS. 15 and 16. It is understood that optical attenuators 1312-2 to 1312-9 typically have a similar construction. Moreover, the structure of optical attenuator 1312-1 is exemplary, and other optical attenuator configurations are considered within the scope of the invention.

Figure 15:
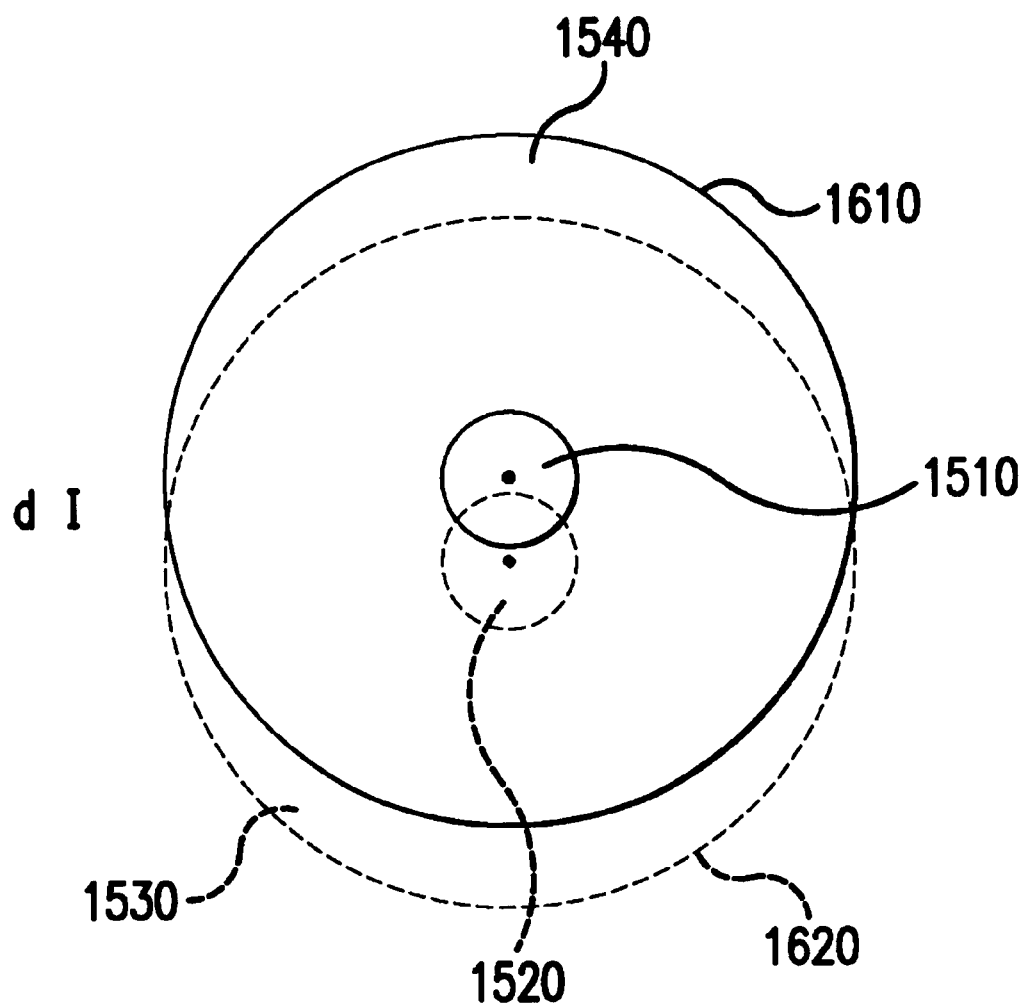
FIG. 15 illustrates a cross-sectional view of an exemplary optical attenuator shown in FIG. 13.
Figure 16:
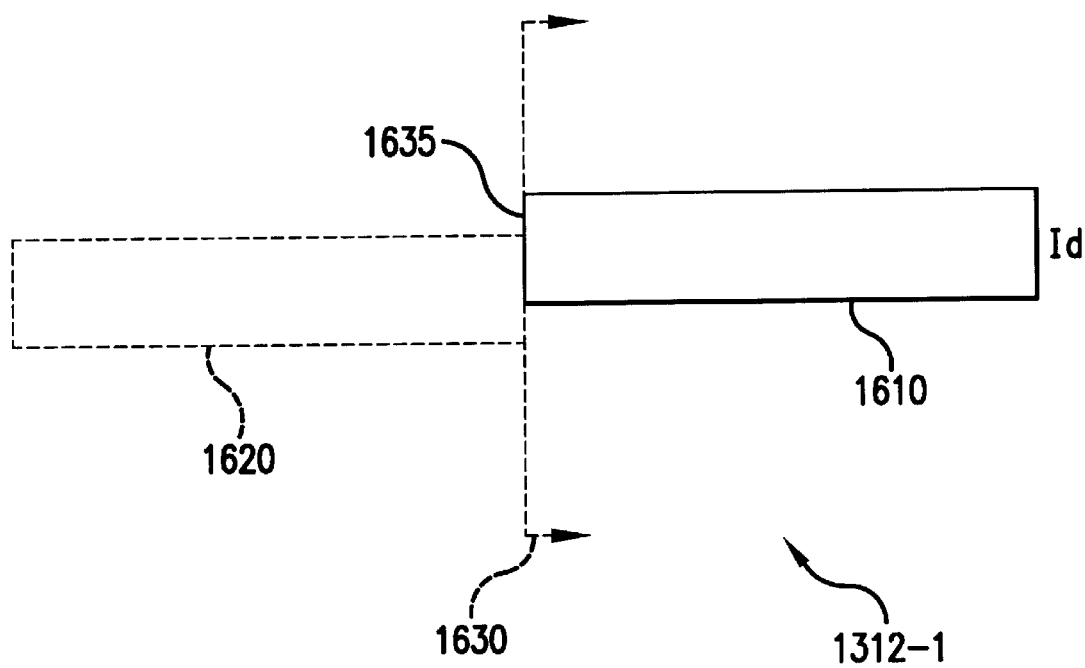
FIG. 16 illustrates a side view of an optical attenuator shown in FIG. 15.

As seen in FIG. 16, optical attenuator 1312-1 includes two optical fibers 1610 and 1620 joined at respective end portions. As further shown in FIG. 15, which is a cross-sectional view of optical attenuator 1312-1 taken along line 1630, fibers 1610 and 1620 further include core regions 1520 and 1510, and cladding regions 1530 and 1540, as commonly understood. Generally, the refractive indices of the core and cladding are selected so that light propagating through fibers 1610 and 1620 is confined to the cores thereof. In addition, the cores and claddings of both fibers are typically provided about respective axes, as is generally known.

As further shown in FIGS. 15 and 16, the axes and thus the cores of fibers 1610 and 1620 are offset from one another by a distance d. Thus a portion of light passing from fiber 1620 to fiber 1610, for example, is dispersed at interface 1635 of the two fibers, while the remaining portion of the light passes through fiber 1610. As a result, light transmitted through interface 1635 experiences loss, and is thus attenuated. The amount of attenuation is determined by offset d; a relatively small offset distance d yields less attenuation while a greater offset distance provides more attenuation.

Typically, offset distance d is adjusted for each of attenuators 1312-1 to 1312-9 so that a different attenuation can be obtained for each attenuator, and as discussed above, substantially equalized optical power can be achieved for each channel output from multiplexer 1300.

Figure 17:
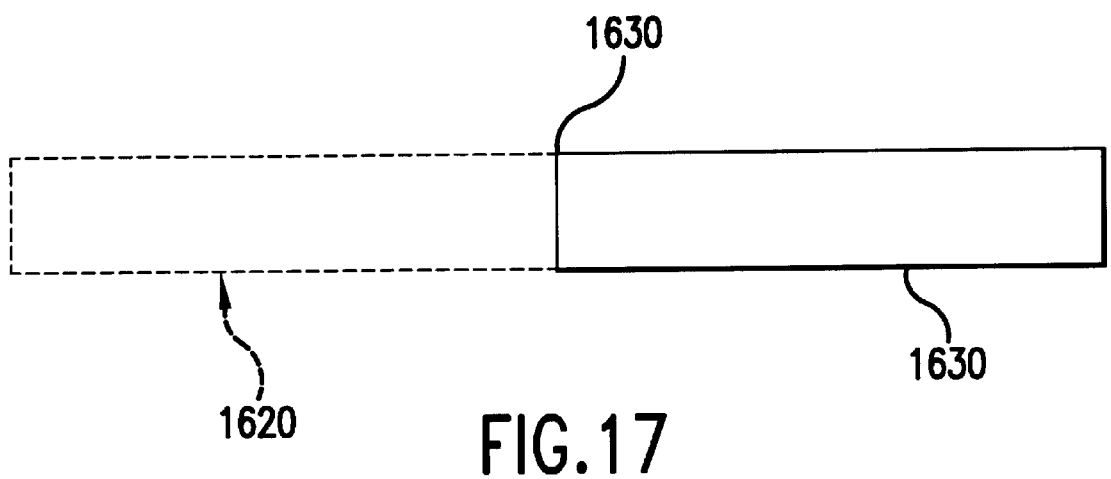
FIG. 17 illustrates a side view of the optical attenuator after fusion splicing.

Typically, fibers 1610 and 1620 are fusion spliced, so that outer surfaces of these fibers are smooth and continuous at interface 1630, as shown in FIG. 17. The cores of the fibers, however, remain offset to provide a desired attenuation, as discussed above.

Multiplexer 1300 has a relatively simple construction and does not require couplers, as is the case with multiplexer 1200 discussed above with reference to FIG. 12.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical device comprising:
   a first optical combiner receiving a first plurality of optical signals, each of which being at a respective one of a first plurality of wavelengths, said first optical combiner having an output supplying said first plurality of optical signals to an optical communication path;
   an optical attenuator coupled to said optical communication path, said optical attenuator having an input receiving said first plurality of optical signals and an output supplying said first plurality of optical signals in attenuated form; and
   a second optical combiner having a first input coupled to said output of said attenuator and receiving said attenuated first plurality of optical signals, and a second input receiving a second plurality of optical signals, each of said second plurality of optical signals being at a respective one of a second plurality of wavelengths, said second optical combiner having an output supplying said first and second pluralities of optical signals, each optical signal within said first and second pluralities of optical signals has substantially uniform optical power.

2. An optical device in accordance with claim 1, wherein said second optical combiner comprises a dielectric filter.

3. An optical device in accordance with claim 1, wherein said optical attenuator comprises:
- a first optical fiber having a core portion and a cladding portion, said core and cladding of said first optical fiber being disposed about a first axis; and
- a second optical fiber having a core portion and a cladding portion, said core and said cladding of said second optical fiber being disposed about a second axis, said first and second optical fibers being joined at respective ends thereof such that said first axis is offset from said second axis.

4. An optical device in accordance with claim 1, further comprising a third optical combiner, said third optical combiner receiving each of said second plurality of optical signals, and having an output for supplying said second plurality of optical signals, said output of said third optical combiner being coupled to said second input of said second optical combiner.

5. An optical device, comprising:
- a first optical combiner having a plurality of inputs, each of which receiving a respective one of a first plurality of optical signals, each of said first plurality of optical signals being at a respective one of a first plurality of wavelengths, said first optical combiner having an output supplying said first plurality of optical signals;
- a first optical attenuator having an input coupled to said output of said first optical combiner and an output supplying said first plurality of optical signals in attenuated form;
- a second optical combiner having a first input receiving said attenuated first plurality of optical signals, a second input receiving a second plurality of optical signals, and an output supplying both said first and second pluralities of optical signals;
- a third optical combiner having a plurality of inputs, each of which receiving a respective one of a third plurality of optical signals, each of said third plurality of optical signals being at a respective one of a third plurality of wavelengths, said third optical combiner having an output supplying said third plurality of optical signals;
- a second optical attenuator coupled to said output of said third optical combiner, said second optical attenuator having an input receiving said third plurality of optical signals and an output supplying said third plurality of optical signals in attenuated form; and
- a fourth optical combiner having a first input coupled to said output of said second optical attenuator, a second input coupled to said output of said second optical combiner and receiving said first and second pluralities of optical signals, and an output supplying said first, second and third pluralities of optical signals.

6. An optical device in accordance with claim 5, wherein said second and fourth optical combiners each include a dielectric filter.

7. An optical device in accordance with claim 5, wherein said first optical attenuator comprises:
- a first optical fiber having a core portion and a cladding portion, said core and cladding of said first optical fiber being disposed about a first axis; and
- a second optical fiber having a core portion and a cladding portion, said core and said cladding of said second optical fiber being disposed about a second axis, said first and second optical fibers being joined at respective ends thereof such that said first axis is offset from said second axis by a first distance.

8. An optical device in accordance with claim 7, wherein said second optical attenuator comprises:
- a third optical fiber having a core portion and a cladding portion, said core and cladding of said first optical fiber being disposed about a third axis; and
- a fourth optical fiber having a core portion and a cladding portion, said core and said cladding of said fourth optical fiber being disposed about a fourth axis, said third and fourth optical fibers being joined at respective ends thereof such that said third axis is offset from said fourth axis by a second distance, said first distance being different than said second distance.

9. An optical device in accordance with claim 5, wherein an attenuation associated with said first optical attenuator is different than an attenuation associated with said second optical attenuator.

10. An optical multiplexer, comprising:
- a first optical combiner receiving a first plurality of optical signals, each of which being at a respective one of a first plurality of wavelengths, said first optical combiner having an output supplying said first plurality of optical signals to a first optical communication path;
- a second optical combiner receiving a second plurality of optical signals, each of which being at a respective one of a second plurality of wavelengths, said second optical combiner having an output supplying said second plurality of optical signals to a second optical communication path;
- an optical attenuator coupled to said second optical communication path, said optical attenuator having an input receiving said second plurality of optical signals and an output supplying said second plurality of optical signals in attenuated form; and
- a third optical combiner having a first input coupled to said output of said attenuator and a second input receiving said first plurality of optical signals, said third optical combiner further having an output supplying said first and second pluralities of optical signals, each optical signal within said first and second pluralities of optical signals has substantially uniform optical power.

11. An optical device in accordance with claim 10, wherein said third optical combiner includes a dielectric filter.

12. An optical device comprising:
- a first plurality of optical combiners, each of which receiving a respective one of a plurality of groups of optical signals, each optical signal within each of said plurality of groups being at a different wavelength, each of said first plurality of optical combiners having a respective output for supplying corresponding ones of said plurality of groups of optical signals;
- a plurality of optical attenuators each of which being associated with a corresponding one of said first plurality of optical combiners, each of said plurality of optical attenuators supplying a corresponding one of said plurality of groups of optical signals through a respective output; and
- a second plurality of optical combiners, each of which being coupled to a respective one of said plurality of optical attenuators, each of said plurality of optical combiners having a first input receiving one of said plurality of groups of optical signals from a corresponding one of said plurality of optical attenuators, a second input receiving at least a different one of said plurality groups of optical signals, and an output supplying said one of said one of said plurality of groups of optical signals and said different one of said plurality of groups of optical signals.

13. An optical device in accordance with claim 12, wherein each of said second plurality of optical combiners comprises a dielectric filter.

14. An optical device in accordance with claim 12, wherein each of optical signals output from one of said second plurality of optical combiners has substantially uniform optical power.

15. An optical communication device in accordance with claim 14, wherein each of said plurality of optical attenuators comprises:

a first optical fiber having a core portion and a cladding portion, said core and cladding of said first optical fiber being disposed about a first axis; and a second optical fiber having a core portion and a cladding portion, said core and said cladding of said second optical fiber being disposed about a second axis, said first and second optical fibers being joined at respective ends thereof such that said first axis is offset from said second axis by an offset distance.

16. An optical device in accordance with claim 15, wherein said offset distance is different for each of said plurality of optical attenuators.

17. A method for multiplexing optical signals, comprising the steps of:

combining a first plurality of optical signals onto a single optical communication path;

attenuating said combined optical signals;

combining a second plurality of optical signals with said first plurality of optical signals, whereby each optical signal within said first and second pluralities of optical signals has substantially uniform optical power.

18. An optical device comprising:

a first optical combiner receiving a first plurality of optical signals, each of which being at a respective one of a first plurality of wavelengths, said first optical combiner having an output supplying said first plurality of optical signals to an optical communication path;

an optical attenuator coupled to said optical communication path, said optical attenuator having an input receiving said first plurality of optical signals and an output supplying said first plurality of optical signals in attenuated form, said optical attenuator comprising:

a first optical fiber having a core portion and a cladding portion, said core and cladding of said first optical fiber being disposed about a first axis; and a second optical fiber having a core portion and a cladding portion, said core and said cladding of said second optical fiber being disposed about a second axis, said first and second optical fibers being joined at respective ends thereof such that said first axis is offset from said second axis; and a second optical combiner having a first input coupled to said output of said attenuator and receiving said attenuated first plurality of optical signals, and a second input receiving a second plurality of optical signals, each of said second plurality of optical signals being at a respective one of a second plurality of wavelengths, said second optical combiner having an output supplying said first and second pluralities of optical signals.

* * * * *